(12) United States Patent
Zou et al.

(10) Patent No.: US 9,991,662 B2
(45) Date of Patent: Jun. 5, 2018

(54) GENERATOR FOR WHOLLY OPTICAL TUNABLE BROADBAND LINEARLY CHIRPED SIGNAL

(71) Applicant: Shanghai Jiao Tong University, Shanghai (CN)

(72) Inventors: Weiwen Zou, Shanghai (CN); Hao Zhang, Shanghai (CN); Jianping Chen, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days. days.

(21) Appl. No.: 15/653,089

(22) Filed: Jul. 18, 2017

(65) Prior Publication Data

US 2017/0317462 A1    Nov. 2, 2017

Related U.S. Application Data

(63) Continuation of application No. PCT/CN2015/074648, filed on Mar. 19, 2015.

(30) Foreign Application Priority Data

Jan. 22, 2015    (CN) .......................... 2015 1 0032390

(51) Int. Cl.
*G02B 6/28* (2006.01)
*G02B 6/00* (2006.01)
(Continued)

(52) U.S. Cl.
CPC .......... *H01S 3/0057* (2013.01); *H01S 3/1106* (2013.01); *H01S 3/1305* (2013.01)

(58) Field of Classification Search
CPC ... H01S 3/06754; H01S 3/1106; H01S 5/0078
(Continued)

(56) References Cited

U.S. PATENT DOCUMENTS

2002/0018213 A1    2/2002 Ibukuro et al.
2002/0044574 A1    4/2002 Abedin
(Continued)

FOREIGN PATENT DOCUMENTS

CN    103592805 A    2/2014
CN    103644971 A    3/2014
(Continued)

OTHER PUBLICATIONS

Zhang, Hao et al., "Generation of a widely tunable linearly chirped microwave waveform based on spectral filtering and unbalanced dispersion," Optics Letters, vol. 40, No. 6, Mar. 15, 2015. p. 1, right column, paragraph 2, to p. 4, right column, paragraph 2.
(Continued)

*Primary Examiner* — Kaveh C Kianni
*Assistant Examiner* — Hung Lam
(74) *Attorney, Agent, or Firm* — Mei & Mark LLP; Manni Li

(57) ABSTRACT

Generator for wholly optical tunable broadband linearly chirped signal comprising a mode-locked laser, a first optical coupler, a first optical filter, a first dispersion module, a second optical filter, a second dispersion module, a tunable time delay module, a second optical coupler, an optical amplifier, and a photodetector. The generator of the present invention employs just one mode-locked laser as a light source, thus preventing instability of the generated signal resulting from independent unrelated lasers. By making use of the principle of wavelength-time mapping and by means of adjusting the center wavelength and the filter bandwidth of the first optical filter and the second optical filter, easy and flexible tuning of the center frequency and sweep bandwidth of the generated linearly chirped signal is realized. The present invention possesses a big advantage on the aspect of
(Continued)

generating a broadband linearly chirped signal over other solutions.

2 Claims, 4 Drawing Sheets

(51) Int. Cl.
*H01S 3/00* (2006.01)
*H01S 3/13* (2006.01)
*H01S 3/11* (2006.01)

(58) Field of Classification Search
USPC .................................................. 385/24, 122
See application file for complete search history.

(56) References Cited

U.S. PATENT DOCUMENTS

2006/0244973 A1* 11/2006 Yun ...................... A61B 5/0059
356/511
2007/0086713 A1* 4/2007 Ingmar ................... G02F 1/365
385/122

FOREIGN PATENT DOCUMENTS

CN 103955028 A 7/2014
CN 104078840 A 10/2014

OTHER PUBLICATIONS

J. Yao, "Photonic generation of microwave arbitrary waveforms", Optics Communications, vol. 284, No. 15, pp. 3723-3736, 2011.
R. Ashrafi, Y. Park, and J. Azaña, "Fiber-based photonic generation of high-frequency microwave pulses with reconfigurable linear chirp control," IEEE Transactions on Microwave Theory and Techniques, vol. 58, No. 11, pp. 3312-3319, Nov. 2010.
H. Gao, C. Lei, M. Chen, F. Xing, H. Chen, and S. Xie, "A simple photonic generation of linearly chirped microwave pulse with large time-bandwidth product and high compression ratio," Optics Express, vol. 21, No. 20, pp. 23107-23115, Sep. 2013.
M. A. Muriel, J. Azaña, and A. Carballar, "Real-time Fourier transformer based on fiber gratings," Optics Letters, vol. 24, No. 1, pp. 1-3, Jan. 1999.

* cited by examiner

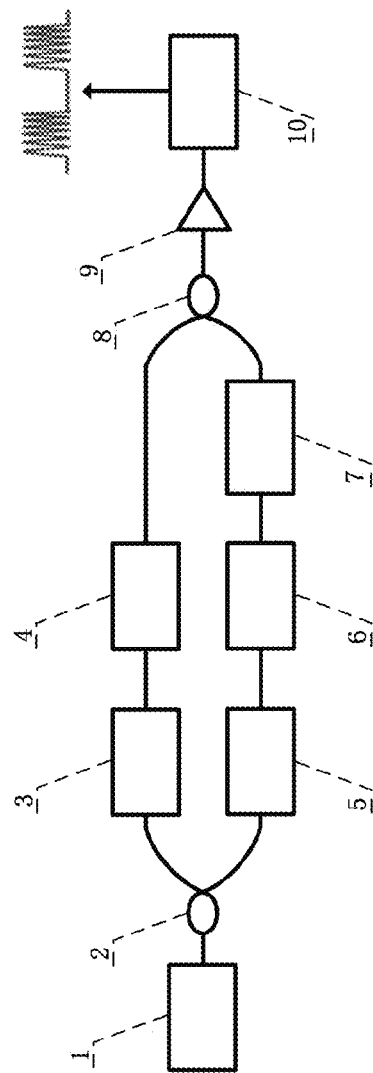
Figure 1
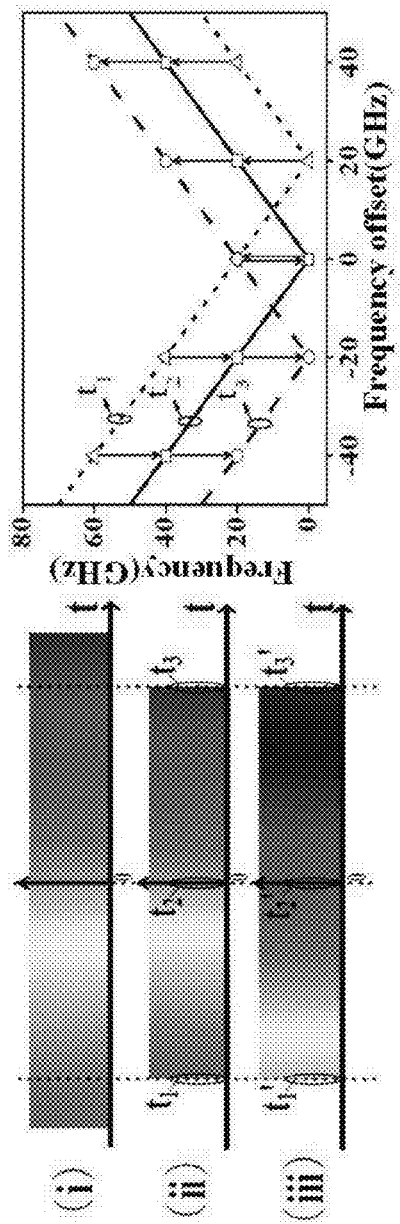
Figure 2(a)
Figure 2(b)
Figure 2

GENERATOR FOR WHOLLY OPTICAL TUNABLE BROADBAND LINEARLY CHIRPED SIGNAL

CROSS-REFERENCE TO RELATED APPLICATIONS

The subject application is a continuation of PCT/CN2015/074648 filed on Mar. 19, 2015 and claims priority on Chinese application no. 201510032390.5 filed on Jan. 22, 2015. The contents and subject matter of the PCT and Chinese priority application are incorporated herein by reference.

FIELD OF INVENTION

The present invention relates to microwave optics and radar, particularly, a generator for a wholly optical tunable broadband linearly chirped signal.

BACKGROUND ART

Linearly chirped signal is one of the signal waveforms frequently employed by a modern radar system, with that of large bandwidth ones capable of elevating radar range resolution. Electronics based prior art generators of arbitrary waveforms generally have comparative narrow bandwidth due to electronic bottlenecks. In comparison, a photon-based linearly chirped signal is capable of providing much larger bandwidth than that based on traditional electronics, with the further advantage of low loss and resistance to electromagnetic interference, and thus may be employed for furtherance of radar capacity.

Methods for generating photon-based broadband linearly chirped signal are mostly based on spatial light, phase modulation or polarization modulation, or that of wavelength-time mapping and of time domain pulse reshaping (See, J. Yao, "Photonic generation of microwave arbitrary waveforms", Optics Communications, vol. 284, no. 15, pp. 3723-3736, 2011). Among the methods, the method of wavelength-time mapping is more attractive owing to its good tunability. Canadian researchers have proposed a method based on fiber Bragg grating and wavelength-time mapping (See R. Ashrafi, Y. Park, and J. Azaña, "Fiber-based photonic generation of high-frequency microwave pulses with reconfigurable linear chirp control," IEEE Transactions on Microwave Theory and Techniques, Vol. 58, no. 11, pp. 3312-3319, 2010.). The shortcoming of this scheme is that the tuning of the center frequency is at the price of decrease of pulse duration, with a further disadvantage of incapacity of easy and flexible control of bandwidth. The Tsinghua University proposes a method of beat frequency of continuous light and mode-locked laser (See H. Gao, C. Lei, M. Chen, F. Xing, H. Chen, and S. Xie, "A simple photonic generation of linearly chirped microwave pulse with large time-bandwidth product and high compression ratio," Optics Express, vol. 21, no. 20, pp. 23107-23115, 2013.). The shortcoming thereof is that use of two unrelated independent lasers results in instability of the generated signal.

SUMMARY OF THE INVENTION

To overcome the defect of the existing technology, the present invention aims at providing a generator for a wholly optical tunable linearly chirped broadband signal which comprises just one mode-locked laser as a light source, thus preventing instability of the generated signal resulting from independent unrelated lasers. The present invention makes use of the principle of wavelength-time mapping to realize easy and flexible tuning of the center frequency and sweep bandwidth of the generated linearly chirped signal by means of adjusting the center wavelength and the filter bandwidth of the first optical filter and the second optical filter. The method of the present invention possesses a big advantage on the aspect of generating a broadband linearly chirped signal over other solutions.

To realize the afore-mentioned objective, the technical solution of the present invention is as follows:

A generator for a wholly optical tunable broadband linearly chirped signal of the present invention comprises a mode-locked laser, a first optical coupler, a first optical filter, a first dispersion module, a second optical filter, a second dispersion module, a tunable time delay module, a second optical coupler, an optical amplifier, and a photodetector.

The above components are interconnected in the following manner:

Along a direction of an output light beam of a mode-locked laser situates a first optical coupler; the first optical coupler splits an input light beam into a first light beam and a second light beam; along the first light beam situates successively the first optical filter, the first dispersion module, and the second optical coupler; along the second light beam situates successively the second optical filter, the second dispersion module, the tunable time delay module, and the second optical coupler; the second optical coupler combines the first light beam and the second light beam, and along an output direction of the second optical coupler situates successively the optical amplifier and the photodetector.

A method for signal regulation of the wholly optical broadband linearly chirped signal generated by the above generator of the present invention comprises the steps of:

① changing a center wavelength difference between the first optical coupler and the second optical coupler for changing a center frequency of the generated broadband linearly chirped signal, thus generating three waveforms of up chirp, down chirp, and down-and-up chirp;

② adjusting a filter bandwidth respectively of the first optical filter and the second optical filter, for altering a pulse duration, a bandwidth, and a corresponding time-bandwidth product of the generated linearly chirped signal; and ③ changing a dispersion respectively of the first dispersion module and the second dispersion module, for changing a frequency sweep slope of the generated broadband linearly chirped signal.

The principle of the present invention is as follows:

An ultra-short pulse signal respectively of the first light beam and the second light beam passing through various dispersions is expressed as follows:

$$y_i(t) = C_i A_i \exp\left[j\left(\omega_i t + \frac{t^2}{2\ddot{\Phi}_i}\right)\right] \quad (1)$$

wherein $$A_i = \{\mathcal{F}[x_j(t)]\}_{\omega-\omega_j=t/\ddot{\Phi}_i} \quad (2)$$

$C_i$ is a constant, $\ddot{\Phi}_i$ is the dispersion respectively of the first dispersion module and the second dispersion module, $\mathcal{F}[x_i(t)]$ is a Fourier transformation respectively of an amplified signal $x_i(t)$ of the first optical filter and the second optical filter, $\omega$ is an absolute angular frequency, $\omega_i$ is a central angular frequency of the filtered pulse signal, t is a time offset relative to a mean time delay $t_i$, with the subscript i=1 or 2 corresponding respectively to the path of first light beam and the second light beam. The optical signal outputted by the second optical coupler passes via the photodetector, with an output current:

$$i(t) = \Re \cdot \{[y_1(t)+y_2(t)] \cdot [y_1(t)+y_2(t)]^*\} = \Re \cdot \{C_1^2 A_1^2 + C_2^2 A_2^2 + 2C_1 C_2 A_1 A_2 \cos[\Phi(t)]\} \quad (3)$$

wherein $$\Phi(t) = (\omega_1 - \omega_2)t + \frac{t^2}{2}\left(\frac{1}{\Phi_1} - \frac{1}{\Phi_2}\right),$$

and $\Re$ is a responsivity of the photodetector. According to the differential relation between the phase and the frequency, the instant frequency may be expressed as:

$$f = \frac{\left|\omega_1 - \omega_2 + \left(\frac{1}{\Phi_1} - \frac{1}{\Phi_2}\right)t\right|}{2\pi} \quad (4)$$

When t=0, the center frequency becomes:

$$f_{center} = \frac{|\omega_1 - \omega_2|}{2\pi} \quad (5)$$

Suppose $\lambda_0$ stand for a mean value of the center wavelength of the first optical filter and the second optical filter, $\Delta\lambda$ be a relatively small filter bandwidth of the respective optical filter, then the pulse duration, frequency sweep bandwidth, time-bandwidth product, and the frequency sweep slope may be respectively expressed as:

$$T_d \approx \frac{|2\pi c \Delta\lambda \Phi_2|}{\lambda_0^2} \quad (6)$$

$$B \approx \frac{c\Delta\lambda}{\lambda_0^2}\left(1 - \frac{\Phi_2}{\Phi_1}\right) \quad (7)$$

$$TBWP = T_d B \approx \frac{2\pi c^2 (\Delta\lambda)^2 \Phi_2}{\lambda_0^4}\left(1 - \frac{\Phi_2}{\Phi_1}\right) \quad (8)$$

$$K = \frac{B}{T_d} \approx \frac{\left|\frac{1}{\Phi_1} - \frac{1}{\Phi_2}\right|}{2\pi} \quad (9)$$

The first optical coupler splits the broadband optical signal outputted by the mode-locked laser into two parts, for entrance respectively into the first optical filter and the second optical filter. Each optical filter respectively has an approximately rectangular filtering shape for bandpass filtering of the broadband light. Each dispersion module introduces dispersion into the filtered broadband light. Suppose the dispersion of each dispersion module be $\Phi$. In accordance with the real time Fourier transformation introduced by the dispersion (See M. A. Muriel, J. Azaña, and A. Carballar, "Real-time Fourier transformer based on fiber gratings," Optics Letters, vol. 24, pp. 1-3, 1999), for an ultra-short pulse, an amplitude thereof at time t is proportional to the Fourier transformation of the input signal at the angular frequency $\omega = t/\Phi$. The filtered spectrum is mapped to the time domain on each path of the light beam, thanks to the dispersion modules. The tunable time delay module is employed for compensation of the time offset between the optical pulse signal on the two light beam paths resulting from the difference in the dispersion/length between the first dispersion module and the second dispersion module. The optical amplifier amplifies the optical signal outputted by the second optical coupler. And finally, the photodetector converts the optical signal into an electrical signal. The frequency linear variation of the electrical signal generated at different moment is actually the linearly chirped signal, since for each pulse observation window, the optical frequency component of the beat frequency of the photodetector at various moments varies linearly at different speed, due to the difference of the dispersion on the two light beam paths. By means of changing the center wavelengths of the first optical coupler and the second optical coupler, that is, by means of changing the corresponding optical frequency difference, the center frequency of the generated broadband linearly chirped signal is changed, thus generating three waveforms of up chirp, down chirp, and down-and-up chirp. By means of changing the filter bandwidth respectively of the first optical filter and the second optical filter, the pulse duration, bandwidth, and corresponding time-bandwidth product of the generated linearly chirped signal is changed.

The present invention is advantageous in the following aspects:

1. The present invention provides a generator for a wholly optical tunable linearly chirped broadband signal. Employment of just one mode-locked laser as a light source results simplicity in structure and cost effectiveness on one hand, and on the other hand prevents instability of the generated signal resulting from independent unrelated lasers.

2. The present invention is simple and easy to implement, as the center frequency of the generated broadband linearly chirped signal is changed and three waveforms of up chirp, down chirp and down- and up chirp are generated by means of simply changing the central wavelength difference between the first optical coupler and the second optical coupler. Theoretically, as long as the spectrum of the mode-locked laser is sufficiently wide, the center frequency of the generated signal is arbitrarily tunable, and is capable of generating linearly chirped signals in various frequency bands, up to the terahertz band.

3. The present invention, by means of changing the filter bandwidth respectively of the first optical filter and the second optical filter, is capable of changing the pulse duration, bandwidth, and corresponding time-bandwidth product of the generated linearly chirped signal.

4. The present invention, by means of changing the dispersion respectively of the first dispersion module and the second dispersion module, is capable of changing a frequency sweep slope of the generated broadband linearly chirped signal.

BRIEF DESCRIPTION OF THE DRAWINGS

FIG. 1 is a schematic diagram of the structure of the generator of the wholly optical tunable broadband linearly chirped signal of the present invention.

FIG. 2 shows the exemplification of the principle of the present invention: FIG. 2(a) is a schematic diagram exemplifying the principle of the present invention; FIG. 2(b) shows variation of the instant frequency at the start, middle, and end respectively of the generated broadband linearly chirped signal, while changing the center wavelength of the second optical filter, that is, the optical frequency difference between the first optical filter and the second optical filter.

FIG. 3 shows the time domain waveforms of a simulated microwave signal in contrasting with their respective Fourier transformations while regulating the optical frequency difference between the first optical filter and the second optical filter, among which, FIG. 3(a) shows the time domain waveform of a simulated microwave signal and FIG. 3(b) shows the corresponding Fourier transformation; FIG. 3(c) shows the time domain waveform of another simulated microwave signal and FIG. 3(d) shows the corresponding Fourier transformation; and FIG. 3(e) shows the time domain waveform of yet another simulated microwave signal and FIG. 3(f) shows the corresponding Fourier transformation.

FIG. 4 shows the time domain waveforms of the measured microwave signal in contrasting with their respective short-time Fourier transformations while regulating the center wavelength of the second optical filter, among which, FIG. 4(a) shows the time domain waveform of a measured signal and FIG. 4(b) shows the corresponding short-time Fourier transformation while regulating the center wavelength of the second optical filter at 0 nm; FIG. 4(c) shows the time domain waveform of a measured signal and FIG. 4(d) shows the corresponding short-time Fourier transformation while regulating the center wavelength of the second optical filter at +0.26 nm; and FIG. 4(e) shows the time domain waveform of a measured signal and FIG. 4(f) shows the corresponding short-time Fourier transformation while regulating the center wavelength of the second optical filter at −0.26 nm.

DETAILED DESCRIPTION OF INVENTION AND EMBODIMENTS

Figure 3:
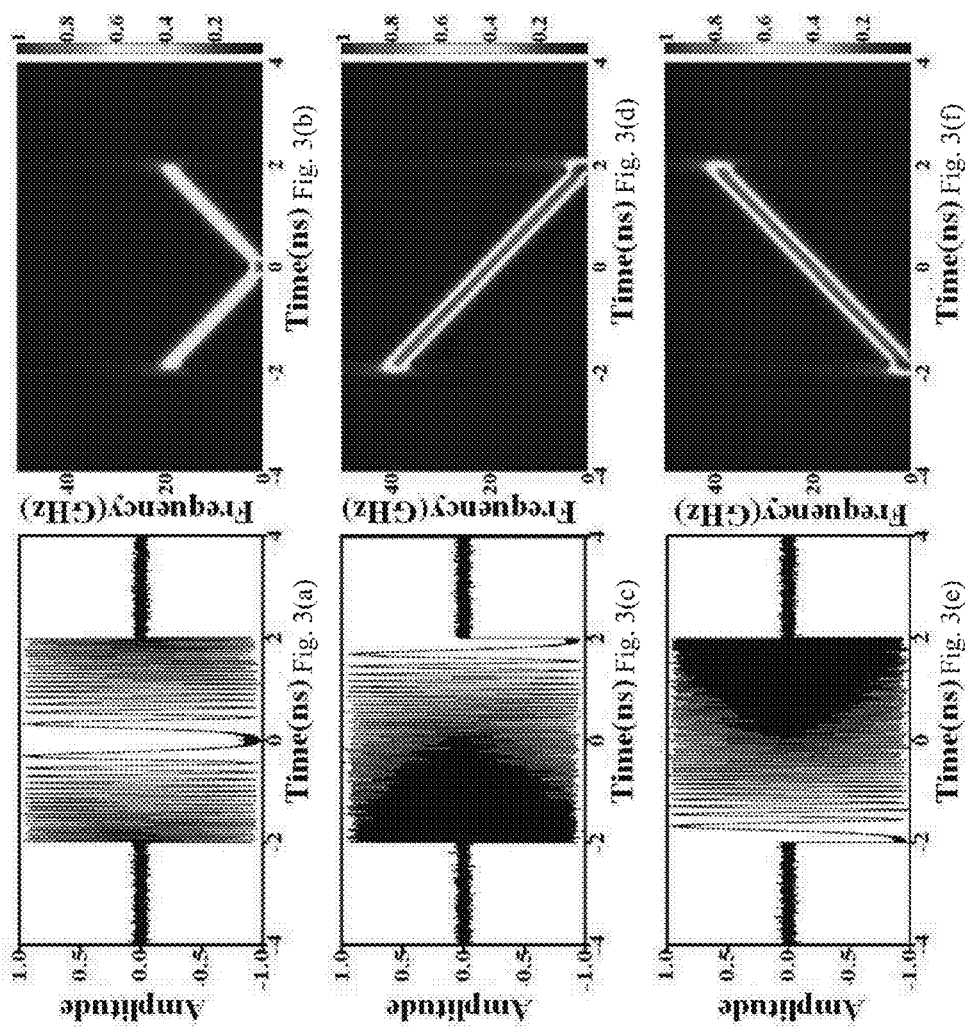

In combination with the figures provided hereunder, the present invention provides an embodiment hereunder, which is implemented based on the technical solution of the present invention and is provided with detailed means and procedure, but which is not meant to limit the scope of protection of the present invention.

FIG. 1 shows a schematic diagram of the structure of the generator for the wholly optical tunable broadband linearly chirped signal of the present invention, comprising a mode-locked laser 1, a first optical coupler 2, a first optical filter 3, a first dispersion module 4, a second optical filter 5, a second dispersion module 6, a tunable time delay module 7, a second optical coupler 8, an optical amplifier 9, and a photodetector 10.

The above components are interconnected in the following manner:

The mode-locked laser 1 connects with the first optical coupler 2; the first optical coupler 2 splits the optical signal into two parts, and which are respectively inputted to the optical input terminals of the first optical filter 3 and the second optical filter 5, with the first optical filter and the second optical filter of the present embodiment both being a tunable optical filter. The optical output terminal of the first optical filter 3 connects with the first dispersion module 4, while the optical output terminal of the second optical filter 5 connects with the optical input terminal of the second dispersion module 6, with the first dispersion module and the second dispersion module of the embodiment being both of dispersion compensation fiber. The optical output terminal of the second dispersion module 6 connects with the optical input terminal of the tunable time delay module 7, while the light output of the first dispersion module 4 and that of the tunable time delay module 7, subsequent to passing the second optical coupler 8, combine into one and is inputted to the input terminal of the optical amplifier 9, with the optical amplifier of the embodiment being an erbium doped optical fiber amplifier for amplifying of optical signal and reduction of link insertion loss. The optical output terminal of the optical amplifier 9 connects with the photodetector 10, and converts the optical signal to an electrical signal.

The principle of the present invention is as follows:

As is shown in FIG. 1, the first optical coupler splits the broadband optical signal outputted by the mode-locked laser into two parts, for entrance respectively into the first optical filter and the second optical filter. Each optical filter respectively has an approximately rectangular filtering shape for bandpass filtering of the broadband light. Each dispersion module introduces dispersion into the filtered broadband light. Suppose the dispersion of each dispersion module be $\ddot{\Phi}$. In accordance with the real time Fourier transformation introduced by the dispersion, for an ultra-short pulse, the amplitude thereof at time t is proportional to the Fourier transformation of the input signal at the angular frequency $\omega = t/\ddot{\Phi}$. The filtered spectrum is mapped to the time domain on each path of the light beam, thanks to the dispersion modules. The signals from the two paths are aligned via the tunable time delay module, and are combined by the second optical coupler. Due to difference of dispersion on the two paths, within each pulse observation window, the optical frequency component of the beat frequency of the photodetector at various moments varies linearly at different speed, and therefore the frequency of the generated electrical signal at various moments varies linearly, that is, the electrical signal being a linearly chirped signal.

FIG. 2(a) shows the optical frequency components of the beat frequency of the photodetector of the first light path and the second light path at various moments as are represented by the grey strips (i) and (ii) when the center wavelengths of the first optical filter and of the second optical filter are the same. The grey strip (iii) stands for the optical frequency component during regulation of the center wavelength of the second optical filter. For the beat frequency of (i) and (ii), the instant frequency at the center moment $t_2$ is 0 GH; for the beat frequency of (i) and (iii), the instant frequency at the center moment $t_2$ has an offset. By means of changing the center wavelengths of the first optical coupler and the second optical coupler, that is, by means of changing the corresponding optical frequency difference, the center frequency of the generated broadband linearly chirped signal is changed, thus generating three waveforms of up chirp, down chirp, and down-and-up chirp. FIG. 2(b) depicts the change of the instant frequency of the generated broadband linearly chirped signal at the start, middle, and end moments during variation of the center wavelength of the second optical filter. Simulation of the three waveforms respectively is depicted in FIG. 3(a) to FIG. 3(f).

Figure 4:
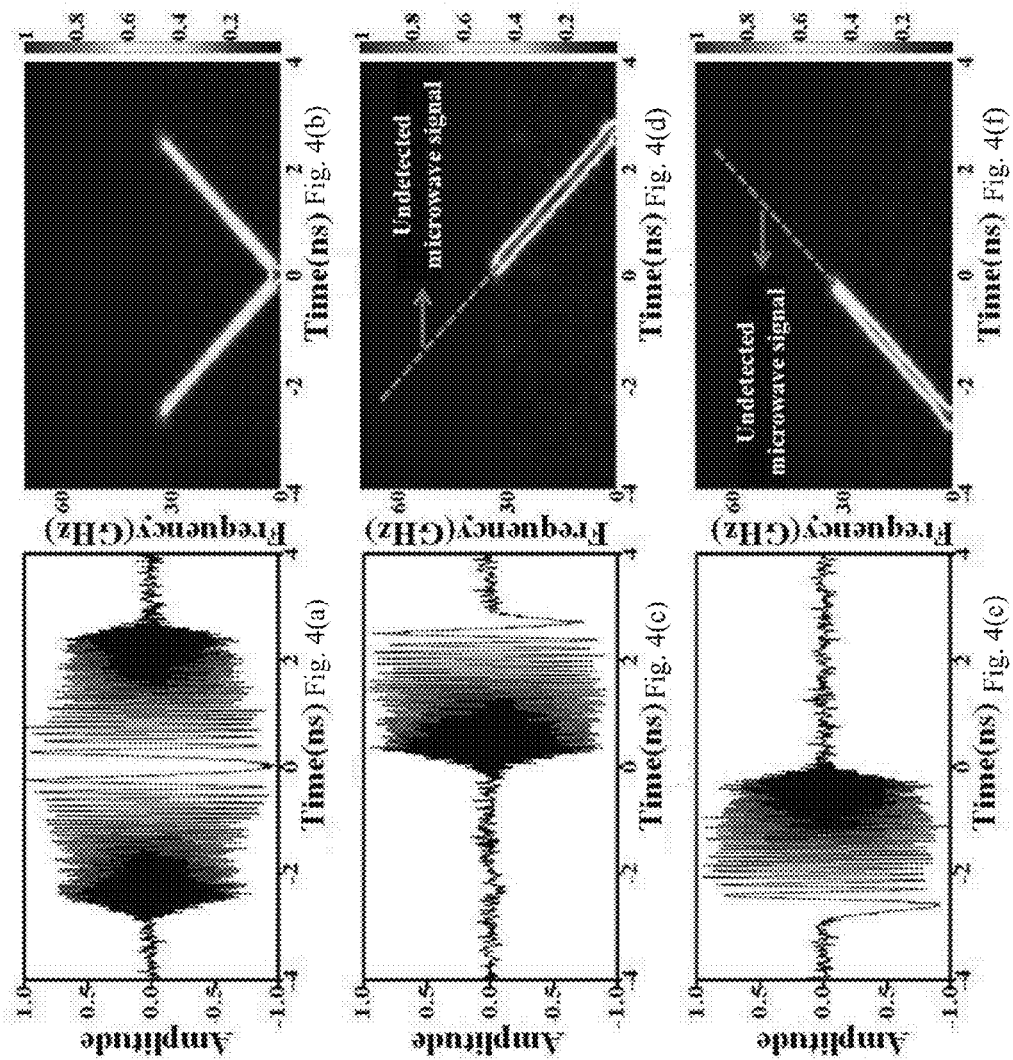

FIG. 4 shows the time domain waveforms (a), (c), and (e) of the measured microwave signal in contrasting with their respective short-time Fourier transformations for the center wavelengths of the second optical filter at (a), (b) 0 nm; (c), (d)+0.26 nm; and (e), (f) −0.26 nm. Subsequent to each regulation thereof, the tunable time delay module on the second light path needs to be regulated for compensation of time offset between the optical pulse signals on the two light paths resulting from the difference in the dispersion/length between the first dispersion module and the second dispersion module. As can be seen therefrom, by means of regulating the difference in center wavelength between the first optical filter and the second optical filter, three waveforms may be generated.

Figure 5:
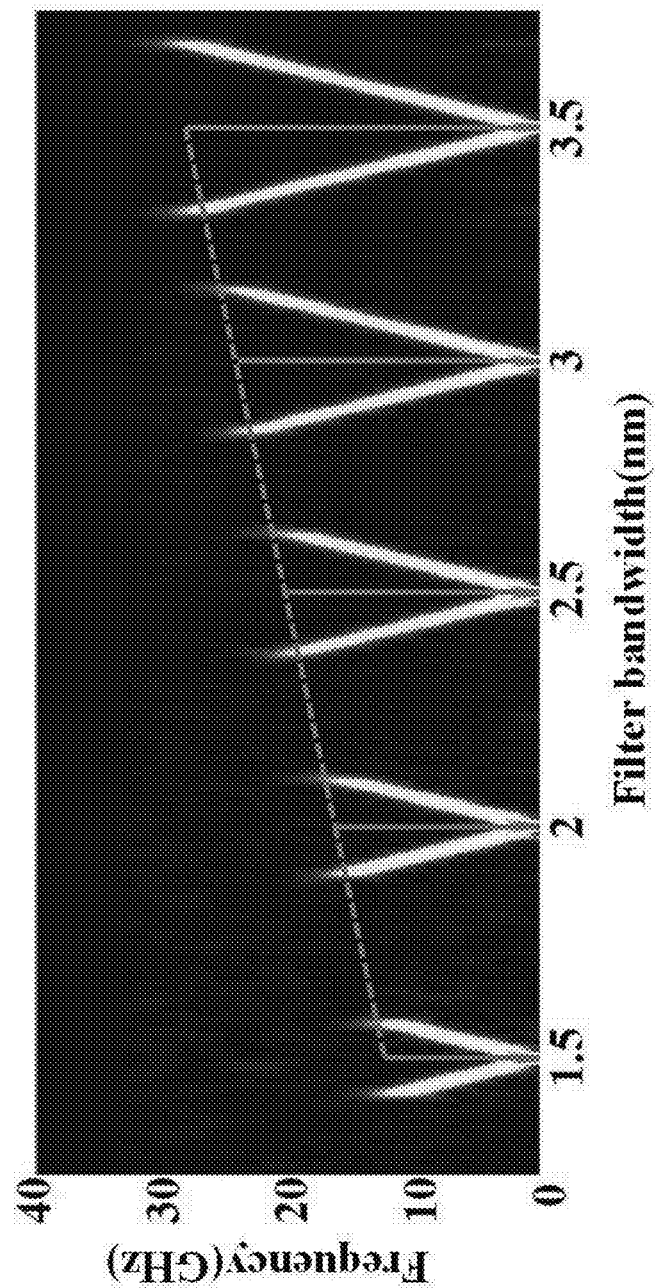
FIG. 5 shows the short-time Fourier transformations of the measured microwave signal while regulating the filter bandwidth of the first optical filter and the second optical filter simultaneously from 1.5 nm to 3.5 nm.

FIG. 5 shows the short-time Fourier transformations of the measured microwave signal during regulation of the filter bandwidth of the first optical filter and the second optical filter simultaneously from 1.5 nm to 3.5 nm. As can be seen therefrom, by means of changing the filter bandwidth respectively of the first optical filter and the second optical filter, the pulse duration, bandwidth, and corresponding time-bandwidth product of the generated linearly chirped signal is changed.

We claim:

1. A generator for a wholly optical tunable broadband linearly chirped signal, comprising
    a mode-locked laser,
    a first optical coupler,
    a first optical filter,
    a first dispersion module,
    a second optical filter,
    a second dispersion module,
    a tunable time delay module,
    a second optical coupler,
    an optical amplifier, and
    a photodetector,
    wherein the first optical coupler is situated along a direction of an output light beam of the mode-locked laser;
    the first optical coupler splits an input light beam into a first light beam and a second light beam;
    the first optical filter, the first dispersion module, and the second optical coupler are successively situated along the first light beam;
    the second optical filter, the second dispersion module, the tunable time delay module, and the second optical coupler are successively situated along the second light beam;
    the second optical coupler combines the first light beam and the second light beam; and
    the optical amplifier and the photodetector are successively situated along an output direction of the second optical coupler,
    wherein filter bandwidth of the first optical filter and the second optical filter are respectively adjustable for altering a pulse duration, a bandwidth, and a corresponding time-bandwidth product of a generated linearly chirped signal; and
    dispersion of the first dispersion module and the second dispersion module are respectively changeable for changing a frequency sweep slope of the generated broadband linearly chirped signal.

2. A method for signal regulation of the wholly optical tunable broadband linearly chirped signal generated by the generator of claim 1, comprising
    changing a center wavelength difference between the first optical coupler and the second optical coupler for changing a center frequency of the generated broadband linearly chirped signal, thus generating three waveforms of up chirp, down chirp, and down-and-up chirp;
    adjusting the filter bandwidth respectively of the first optical filter and the second optical filter for altering the pulse duration, the bandwidth, and the corresponding time-bandwidth product of the generated linearly chirped signal; and
    changing the dispersion respectively of the first dispersion module and the second dispersion module for changing the frequency sweep slope of the generated broadband linearly chirped signal.

* * * * *